United States Patent [19]

Kharrazi

[11] Patent Number: 4,968,512

[45] Date of Patent: Nov. 6, 1990

[54] METHOD OF MAKING A YOGURT SPREAD

[76] Inventor: N. Michael Kharrazi, 201 Canon Dr., Santa Barbara, Calif. 93105

[21] Appl. No.: 453,860

[22] Filed: Dec. 20, 1989

[51] Int. Cl.[5] ...................... A23C 9/12; A23C 19/076; A23C 20/00

[52] U.S. Cl. ........................................ 426/40; 426/36; 426/43; 426/582; 426/583

[58] Field of Search ...................... 426/40, 36, 34, 583, 426/41, 582, 43

[56] References Cited

U.S. PATENT DOCUMENTS 4,066,791 1/1978 Corbin, Jr. ............................ 426/40
4,434,184 2/1984 Kharrazi ................................ 426/40

*Primary Examiner*—Marianne Cintins
*Attorney, Agent, or Firm*—Jack C. Munro

[57] ABSTRACT

The yogurt spread which has a consistency of conventional cream cheese and has similar texture and taste but with substantially diminished fat, calories and cholesterol content from conventional cream cheese. The yogurt spread is produced by removing the majority of the fat and moisture from milk, heating the milk to a temperature greater than one hundred eighty degrees Fahrenheit, cooling the milk to approximately one hundred seven degrees Fahrenheit, then evenly mixing to the milk a quantity of yogurt starter culture and providing sufficient time for the resulting mixture to form yogurt in a solid mass form.

3 Claims, No Drawings

METHOD OF MAKING A YOGURT SPREAD

BACKGROUND OF THE INVENTION

The field of this invention relates to a method of producing a food in the form of a yogurt spread which has the appearance, texture, taste and viscosity of conventional cream cheese, but has a fat content, cholesterol and calories for below that of conventional cream cheese.

Within a recent report of the United States Surgeon General, there was a conclusion manifested that one million two hundred thousand deaths within the United States each year are diet related. There are three principle culprits responsible for these deaths and these are high fat, high calories and high cholesterol. A common food in the United States is cream cheese. Cream cheese has thirty-four percent fat, one hundred calories per ounce and one hundred milligrams of cholesterol for each one hundred grams. Cream cheese is the type of product which is high in all three undersirable culprits.

Food researchers in the past few years have made a concerted effort in developing food products which are nutritious, palatable and which contain reduced levels of calories, cholesterol and fat. Examples of each products that are now being marketed successfully are yogurt and skim milk. The diet consciousness of people has resulted in over four billion dollers in annual sales of yogurt within the United States in 1988. In 1967, there was only about twenty five million dollars in annual sales of yogurt.

Previously, the present inventor obtained a U.S. Pat. No. 4,434,184 entitled "YOGURT SPREAD RESEMBLING CREAM CHEESE". The method within this patent ended with the centrifuging step to remove whey. Yogurt whey is quite acidic. Most municipalities prohibit the discharging of yogurt whey directly into a sewer system. Therefore, special procedures have to be taken to dispose of this waste product. Also, within the aforesaid patent, it was required to use special equipment such as a centrifuge, special filter or reverse osmosis equipment to produce the yogurt whey. It would be most desirable if yogurt could be produced without utilizing the step of centrifuging, ultra-filtration or reverse osmosis and also which eliminated the producing of the yogurt whey.

SUMMARY OF THE INVENTION

The primary objective of the present invention is to produce a yogurt spread without the producing of yogurt whey as a waste product.

Another objective of the present invention is to eliminate need of expensive machinery which is needed to produce the yogurt whey such as a centrifuge, ultra-filtration or reverse osmosis equipment.

Another objective of the present invention is to include the step of removing moisture from within the milk prior to the adding of the yorgurt culture and thereby producing yogurt which produces a sweet whey which can be disposed of in conventional sewer systems without any undersirable affects which is not objected to by municipalities.

Each of the methods of this invention, whey-less and lypholyzed, start with a quantity of liquid milk. In the whey-less method, fat and moisture are then removed from the milk. This milk is then heated to a temperature between one hundred eighty degrees and two hundred twelve degrees Fahrenheit with this heating only needed to occur momentarily. This heating destroys bacteria within the milk. The milk is then cooled to approximately one hundred seven degrees Fahrenheit. To this milk is added a quantity of yogurt starter culture. Sufficient time is then provided such as four to twelve hours for the resulting mixture to form a semisolid mass yogurt. The yogurt is then packaged in a desirable manner either in a block form or in tub form and sold to the consumer. At the same time that the yogurt starter culture is mixed into the milk, there may also be added sweeteners and/or flavors if such are deemed to be desired. In the lypholyzed method, skim milk is heated to about two hundred twelve degrees Fahrenheit. At this temperature, a quantity of white vinegar (four to eight ounces per gallon of milk) is added to the milk. Citric and/or adipic acid could be used instead of the vinegar. Generally, this amounts to around two percent of the weight of the milk. The mixture is now cooled to approximately one hundred seven degrees Fahrenheit which coagulates due to the introduction of the acid(s). Live yogurt culture, such as lypholyzed yogurt, up to five percent of the weight of the mixture is evenly mixed into the mixture. The resulting product is then packaged for usage. Both the whey-less method and the lypholyzed method produce a product with the viscosity of cream cheese. Both products can have additional moisture removed and produce a solid, brick-like product similar to hard cheeses such as Jack, Chedder, Swiss, etc.

DETAILED DESCRIPTION OF THE INVENTION

The foodstuff of the present invention relates to a semisolid type of product which resembles cream cheese in appearance, texture and taste and which has a fat content of approximately one percent (versus thirty-four percent for conventional cream cheese), twenty calories per once (versus one hundred calories for conventional cream cheese) and 3.4 milligrams of cholesterol per one hundred grams (versus 100 milligrams of cholesterol per one hundred grams of conventional cream cheese). The spread of the present invention is constructed principally of yogurt which is known to be highly nutritious and also highly desirable for those who wish to decrease their caloric intake and reduce the fat content of their diet.

Each of the methods by which the spread of the present invention is made starts with milk as the basic ingredient. The milk can be either reconstituted powdered, regular, low-fat or skim (non-fat). The milk is run through a separator to remove the butterfat content. The resulting milk product now has a substantial amount of the moisture removed and this can be accomplished easily by applying a conventional vacuum moisture removing process. Approximately seventy-five percent of the moisture is to be removed. The removed moisture is to be disposed of in any desirable manner and there is no problem to dispose of the moisture directly into a sewage system since at this particular time the whey that has been removed is not harmful to the enviornment.

The milk product in the whey-less method is then to be heated momentarily to a temperature level between one hundred eighty and two hundred twelve degrees Fahrenheit. It is only necessary for the milk to reach the desired temperature which will cause the bacteria contained within the milk to be destroyed. The milk is then cooled to approximately one hundred seven degrees Fahrenheit. It is important to the subject invention that this temperature be precisely controlled. To the now cooled milk, there is to be evenly mixed a quantity of yogurt starter culture. Only a very minute amount of this culture need be necessary. As a general rule, one-half percent to three percent of yogurt starter is added to the milk. Satisfactory yogurt starters are Lactobacillus bulgaricus, Streptococcus thermophilus or Lactobacillus acidophilus. Lypholyzed dry yogurt culture has been found to be satisfactory. This lypholyzed dry yogurt culture is a powdered yogurt which contain dormant live yogurt culture. This culture will be released when it comes into contact with moisture.

At this particular time, it is desirable to include any kind of a sweetener or flavor such as a fruit flavor. This is to be evenly mixed within the milk. Generally, also a small amount of gum such as guar gum or locust bean gum will be added. Also, a small amount of salt may be added.

The resulting product is permitted to incubate which generally takes between four to twelve hours and in most likely between five to eight hours. After incubation, the milk has now assumed a solid mass form but which is spreadable similar to butter or cream cheese. The mass can be packaged in brick form or can be placed within tubs and now distributed or sold to the consumer.

The second method, as previously mentioned in the Summary of this invention, is called the lypholyzed method. In this method, the milk, which is usually skim milk, is increased in temperature to approximately two hundred twelve degrees Fahrenheit. At this temperature, a quantity of acid is added which can either be the following acids taken alone or in combination: white vinegar, citric or adipic. Generally, four to eight ounces of acid is added per gallon of milk which comes to approximately two percent of the weight of the milk. The mixture is now cooled with coagulation occurring due to the introduction of the acid. Cooling occurs to approximately one hundred seven degrees Fahrenheit. To this now milk/acid mixture there is added a live yogurt culture such as dry lypholyzed yogurt. The amount of lypholyzed yogurt will constitute approximately five percent in weight of the cooled mixture. The lypholyzed yogurt is thoroughly mixed with the mixture for even distribution of the culture. The advantage of the lypholyzed method as compared to the whey-less method is that the lypholyzed yogurt eliminates the "incubation period". Therefore, within the lypholyzed method the process of obtaining the finished product is shortened, lowering its cost, since four to twelve hours of time has been eliminated.

In the past, making of a yogurt spread such as is disclosed within U.S. Pat. No. 4,434,184 as previously menttioned, requires the use of expensive centrifuge machinery that is not needed within the process of the present invention. Also, and more importantly, there is not produced any environmentally harmful whey which becomes an environmental disposal problem. The whey that is produced is sweet (non-acidic) and therefore harmless to any conventional sewage system.

There are many advantages of eating yogurt. Scientists have now discovered that yogurt has an antibiotic affect by helping to combat antibiotic-produced diarrhea and patients taking certain antibiotics which destroy the natural antagonist to organisms such as clostridium-difficile. Yogurt also can permit lactose-intolerant people to digest dairy products, can aid the immune system and help fight gastro-intestinal illnesses. Yogurt cultures produce proteins called "bacteriocins" which may help prevent or manage some types of cancer by delaying onset or protect against cancer of the colon and breast. Yogurt also helps prevent the elevation of cholesterol and has antimutagenic affects. Yogurt is also said to enhance the immune response within human beings. Also, yogurt is a good source of protein, calcium, potassium, phosphorus, Vitamins $B_{12}$ and riboflavin.

What is claimed is:

1. The method of making a yogurt spread having a consistency of cream cheese and substantially reduced fat, calories and cholesterol from conventional cream cheese comprising the sequential steps of:
   utilizing a quantity of liquid milk;
   separating the majority of that fat from the liquid milk;
   removing the majority of the moisture from the liquid milk comprising approximately seventy-five percent of the total moisture content producing a non-harmful whey;
   disposing of the whey;
   heating the liquid milk to a temperature between one hundred eightly degrees and two hundred twelve degrees Fahrenheit;
   cooling the liquid milk to approximately one hundred seven degrees Fahrenheit; and
   evenly mixing a quantity off yogurt starter culture to the cooled milk and providing sufficient time for the resulting mixture to form yogurt in a solid mass form.

2. The method as defined in claim 1 wherein the yogurt starter culture is selected from the group consisting of Lactobacillus bulgaricus, Streptococcus thermophilus and Lactobacillus acidophiplus.

3. The method as defined in claim 1 wherein the step of removing is accomplished by the aid of a vacuum.

* * * * *